US008392337B2

(12) United States Patent
Lee et al.

(10) Patent No.: US 8,392,337 B2
(45) Date of Patent: Mar. 5, 2013

(54) GENERATION OF UNIQUE MAIL ITEM IDENTIFICATION WITHIN A MULTIPLE DOCUMENT PROCESSING SYSTEM ENVIRONMENT

(75) Inventors: Raymond Lee, Palatine, IL (US); Brian Bowers, Mundelein, IL (US)

(73) Assignee: Bell and Howell, LLC, Durham, NC (US)

( * ) Notice: Subject to any disclaimer, the term of this patent is extended or adjusted under 35 U.S.C. 154(b) by 583 days.

(21) Appl. No.: 12/426,484

(22) Filed: Apr. 20, 2009

(65) Prior Publication Data

US 2009/0287343 A1 Nov. 19, 2009

Related U.S. Application Data

(60) Provisional application No. 61/053,966, filed on May 16, 2008.

(51) Int. Cl.
*G06Q 30/00* (2006.01)
*G06Q 10/00* (2006.01)

(52) U.S. Cl. ........................................ 705/330; 706/7.12

(58) Field of Classification Search ........................ None
See application file for complete search history.

(56) References Cited

U.S. PATENT DOCUMENTS

| | | | | |
|---|---|---|---|---|
| 6,303,889 | B1 * | 10/2001 | Hayduchok et al. | 209/584 |
| 6,998,558 | B2 * | 2/2006 | Forella et al. | 209/584 |
| 7,413,114 | B2 * | 8/2008 | Miette et al. | 235/375 |
| 2003/0191556 | A1 * | 10/2003 | Stiebel et al. | 700/219 |
| 2004/0249764 | A1 * | 12/2004 | Delitz et al. | 705/60 |
| 2005/0065897 | A1 * | 3/2005 | Ryan et al. | 705/401 |
| 2006/0080266 | A1 * | 4/2006 | Kiani et al. | 705/402 |
| 2006/0089921 | A1 * | 4/2006 | Witmond et al. | 705/401 |
| 2006/0108266 | A1 * | 5/2006 | Bowers et al. | 209/584 |
| 2006/0136346 | A1 * | 6/2006 | Gilham | 705/402 |
| 2006/0161506 | A1 * | 7/2006 | Stumm et al. | 705/408 |
| 2007/0043580 | A1 * | 2/2007 | Miller et al. | 705/1 |
| 2007/0067248 | A1 * | 3/2007 | Chatte | 705/401 |
| 2007/0143125 | A1 * | 6/2007 | Foth et al. | 705/1 |
| 2008/0082205 | A1 * | 4/2008 | Park et al. | 700/223 |
| 2009/0216369 | A1 * | 8/2009 | Gotz et al. | 700/226 |

* cited by examiner

*Primary Examiner* — George Chen
(74) *Attorney, Agent, or Firm* — McDermott Will & Emery LLP

(57) ABSTRACT

The present teachings relate to a method and system for the processing of mail items within a multiple device document processing environment to ensure generation of unique mail items. The present teachings provides for an improved system and method for assigning and maintaining unique mail item identifiers and processing of the unique mail items in a multiple mail processing device environment to qualify for maximum postal work sharing discounts.

10 Claims, 6 Drawing Sheets

GENERATION OF UNIQUE MAIL ITEM IDENTIFICATION WITHIN A MULTIPLE DOCUMENT PROCESSING SYSTEM ENVIRONMENT

RELATED APPLICATIONS

This application claims the benefit of U.S. Provisional Application No. 61/053,966, filed May 16, 2008, the disclosure of which is entirely incorporated herein by reference.

TECHNICAL FIELD

The subject matter discussed herein relates to a method and system for processing mail items within a multiple device document processing environment to ensure generation of unique mail items.

BACKGROUND

Document processing facilities often use high speed document processing machines such as sorters, to sort and direct mail items appropriately to one or more mail bins for distribution. Various types or stages of processing may occur during sorting of the mail items as they are transported at high speeds along a transport path of the sorter via a system of mechanized pulleys, levers and rollers. Such processes may include, but are not limited to imaging of each mail item at various moments of transport, interpretation of address components (e.g., recipient addresses, ZIP codes, barcodes) based on the image as marked upon the mail items for enabling association of each mail item with a sort scheme, printing upon the mail item, application of labels, opening or cutting of the mail item, etc. Generally, these processes are coordinated by one or more computers operating in connection with the sorter. In a multi-sorter environment, where a mailing is distributed for processing amongst multiple sorters, a server may act as a central administrator of sorter activity—i.e., facilitating data exchange, managing job scheduling and processing, coordinating sort schemes amongst sorter devices, distributing jobs to be run, etc.

The common goal of any sort operation is to arrange a plurality of disparate mail items into mail groups that conform to postal authority standards, thereby maximizing postal work sharing discounts. Consequently, when a customer (mailer) submits its mail for processing to a sort processing site that employs multiple sorters, it is common for the customer's mail items to be distributed amongst multiple sorters. Furthermore, the customer's mail may be combined with the mail of differing customers as a means for the sort processing site to increase its number of mail items that quality for postal authority work sharing discounts. Where there are several differing mail items belonging to differing customers, the mail items of each customer must indicate a postal authority assigned mailer identification as a means to enable tracking of the mail items. Generally, this mailer identification is encoded within a postal authority approved code, such as an Intelligent Mail Barcode, in combination with a unique number (sequence number) and service type identifier. The combination of the mailer identification value, the unique number and service type identifier is intended to ensure uniqueness of the mail item for a specified period of time. In a multiple document processing environment where a particular customer's mail items may be distributed across multiple sorters, means for assigning and maintaining unique numbers is critical given the recurrence of the customer's mailer identification. Lack of proper coordination, usage and communication of the values to be used for generating postal authority approved codes can result in improper assignment of said codes to mail pieces and corruption of the mail's integrity. Such coordination is even more important when one considers the varying data range requirements of the postal authority approved code with respect to a given mailer.

Therefore there exists a need for an improved system and method for assigning and maintaining unique identifiers to mail items and processing of the mail items in a multiple mail processing device environment to maximize postal work sharing discounts.

SUMMARY

It is desirable to provide a method for assigning a unique value to each of a plurality of mail items received from one or more mailers. The assigned unique values are used in connection with processing of the mail items by a plurality of mail processing devices. The method comprises establishing an initial range of values for use in generating a postal authority approved code to be applied to each respective mail item of the one or more mailers during processing by one of the plurality of mail processing devices. The initial range has a maximum value relating to a specific mailer identification. A portion of the initial range of values is allocated to the plurality of document processing devices based at least in part on one of a historical mail count of the one or more mailers, an actual mail count of the one or more mailers or a mailer provided portion of said range. A unique value from the allocated portion is assigned to each of the plurality of mail items processed by one of the plurality of document processing devices. The assigned value to be incorporated within the postal authority approved code is applied to the respective mail item and a record of each of the values assigned is stored.

It is also desirable to provide a method for configuring a plurality of mail item sorters. The method includes receiving job information pertaining to a plurality of mail items received from a mailer to be processed amongst the plurality of sorters. Each of the respective sorters is registered and the registration step includes steps of: accessing the job information for a respective sorter from an interface to a server; accessing a range of values to be used in connection with a postal authority approved code to be applied on each of the plurality of mail items said range being accessed from the interface to the server, wherein each range of values conforms to a specific mailer identification; and allocating a portion of each of the ranges of values to be used by the sorters based at least in part on the received job information. A last used value from within each of the ranges and an associated date of usage by each respective sorter is verified prior to processing.

It is yet further desirable to provide a system for processing mail items. The system includes a plurality of mail processing devices for processing the mail items of a particular mailer. A server device is adapted to perform steps including: allocating the mail items amongst the plurality of mail processing devices based on one or more received job requirements; establishing an initial range of values for use in generating a postal authority approved code to be applied to each mail item during processing by the plurality of mail processing devices, wherein the initial range has a maximum value relating to a specific mailer identification; and allocating a portion of each of the ranges of values to be used by the mail processing devices based at least in part on the received job requirements. The system includes a control processor that is associated with each mail processing device for: accessing the one or more job requirements for a respective mail processing device from the server; and verifying a last used value from within each of the ranges and an associated date of usage by each respective sorter prior to processing.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict concepts by way of example, not by way of limitations. In the figures, like reference numerals refer to the same or similar elements. In the figures, like reference numerals refer to the same or similar elements.

DETAILED DESCRIPTION

As used herein, a "mail item" refers to any article having human or machine readable content generated thereon, and particularly intended for delivery to a given recipient. Mail items may include, but are not limited to, envelopes, newsletters, newspapers, magazines, post cards, parcels or packages of varying thicknesses (e.g., flat mail), coupon booklets, brochures, and other like documents. Such items may or may not be generated for the purpose of being distributed via an outgoing distribution channel (e.g., delivery company, postal authority), but rather, may be generated for direct/personal carry, private delivery, or internal distribution.

Also, as used herein, a "document or mail processing system" refers to any high speed transport device(s) capable of processing mail items at considerably high rates with considerably high precision. Document processing systems may include, but are not limited to, inbound sorting equipment, outbound mail sorting equipment, various forms of inserter machines, mail integrity (visual or data) systems, accumulating equipment, printing equipment or the like for office, commercial or industrial settings. While the following discussion will present the teachings in an exemplary fashion with respect to a sorter device, it will be apparent to those skilled in the art that the teachings may apply to any type of document processing device or system desiring or requiring the generation of unique mail item identification.

Figure 1:
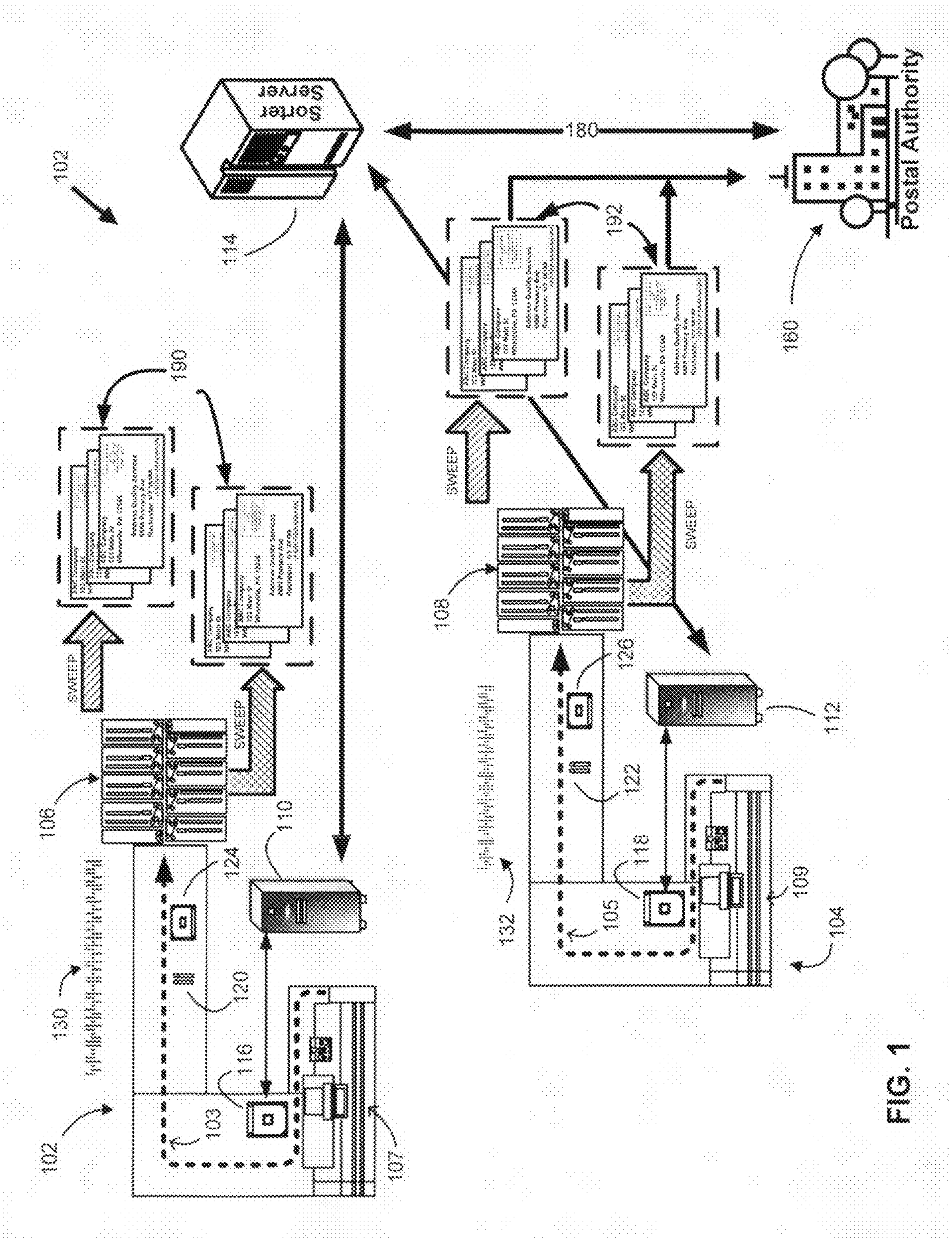
FIG. 1 depicts an exemplary mail processing environment for enabling the distribution of mail processing tasks.

FIG. 1 depicts an exemplary multiple device document processing environment 100 for processing mail items. The mail processing environment includes a plurality of sorters 102 and 104, each capable of processing a plurality of mail items at high speeds into one or more sort bins 106 and 108, respectively. Each sorter features a transport path 103 and 105, respectively, along which mail items are moved from a magazine in-feed system 107 and 109 to the sort bins 106 and 108, a collection of pockets intended for holding mail items. Along the transport path 103 and 105, various additional processing devices operate upon mail items as they are guided along the transport path 103 and 105 to the sort bins, including but not limited to: one or more printers 120 and 122 for enabling the application of additional markings onto a mail item, encoders or generators for enabling the use of postal authority codes, such as 130 and 132 (e.g., PLANET, POSTNET, Intelligent Mail Barcode), a postal code verification system 124 and 126 for validating barcode integrity and application, reader systems 116 and 118 for detecting and interpreting address components and/or delivery point identifiers as placed onto the mail item, etc. A delivery point identifier may include a ZIP code designation—5-digit, 9-digit or 11-digit. Address components as marked upon the mail item, may include but are not limited to the recipient's name, recipient's point of delivery, street name, street number, suite or apartment number, P.O. Box, city and state.

The sort bins 106 and 108 are populated with mail items in accord with a sort scheme, instructions that dictate the behavior of the sorter device, the above described additional processing devices, and which sort bin a mail item is to be placed in response to the detection and/or interpretation of the one or more delivery point identifiers or address components. Generally, the sort scheme is a function of the delivery point identifiers and/or the address components, postal authority mail grouping rules (also referred to commonly as a postal ZIP scheme), the resource constraints of the sorter such as the number of pockets available and other considerations. Hence, as different mail items indicate different delivery point identifiers corresponding to differing mail grouping rules, the way in which mail items are placed into bins will vary accordingly. Similarly, the behavior of the above mentioned additional processing devices operating along the transport path 103 and 105 will vary accordingly.

Sort scheme data is generally maintained and executed by a sorter computer 110 and 112, which operates in connection with the sorter device 102 and 104. Alternatively, in a multi-device environment 100 as depicted in the exemplary figure, respective sorter computers 110 and 112 may further communicate with a sorter server 114, which facilitates data exchange and coordinates mail processing tasks between sorters. Moreover, the sorter server 114 may facilitate subsequent pass processing between the multiple sorters in instances where additional processing of mail items is required to generate maximum postal authority discounts respective to a sort scheme. Even still, the sorter server may also facilitate communication 180 between the mail processing environment and the postal authority 160, such as to fulfill data reporting requirements or the like. The mail items are eventually manually swept from the sort bins 106 and 108 into mail trays; the mail trays being further aggregated to formulate distinct postal groups 190 and 192.

In a multi-device environment 100, first pass processing is useful for determining what the characteristics (e.g., various ZIP Code designations) of the mailing is overall, but not necessarily for processing the mail to a finer level of sort. Finer level sorting may include grouping the mail items into progressively higher ZIP Code qualification levels-i.e., the grouping of mixed ZIP Code designations comprising a mailing into qualifying 5-digit groups, resulting in increased work sharing discounts respective to the 5-digit group level. This is typically the intent of subsequent pass processing, which may or may not be performed by the same sorter. Those skilled in the art will recognize that varying sort operators, entities, etc.

may employ differing sort distribution and processing schemes as required. Of particular relevance to the examples herein is the nature of communication between the sorter server 114 and the sorter computers 110 and 112 for enabling proper maintenance of unique identification assignment for a plurality of mail items within a multi-sorter environment; so as to ensure compliance with postal authority requirements for said mail items.

Figures 2A, 2B:
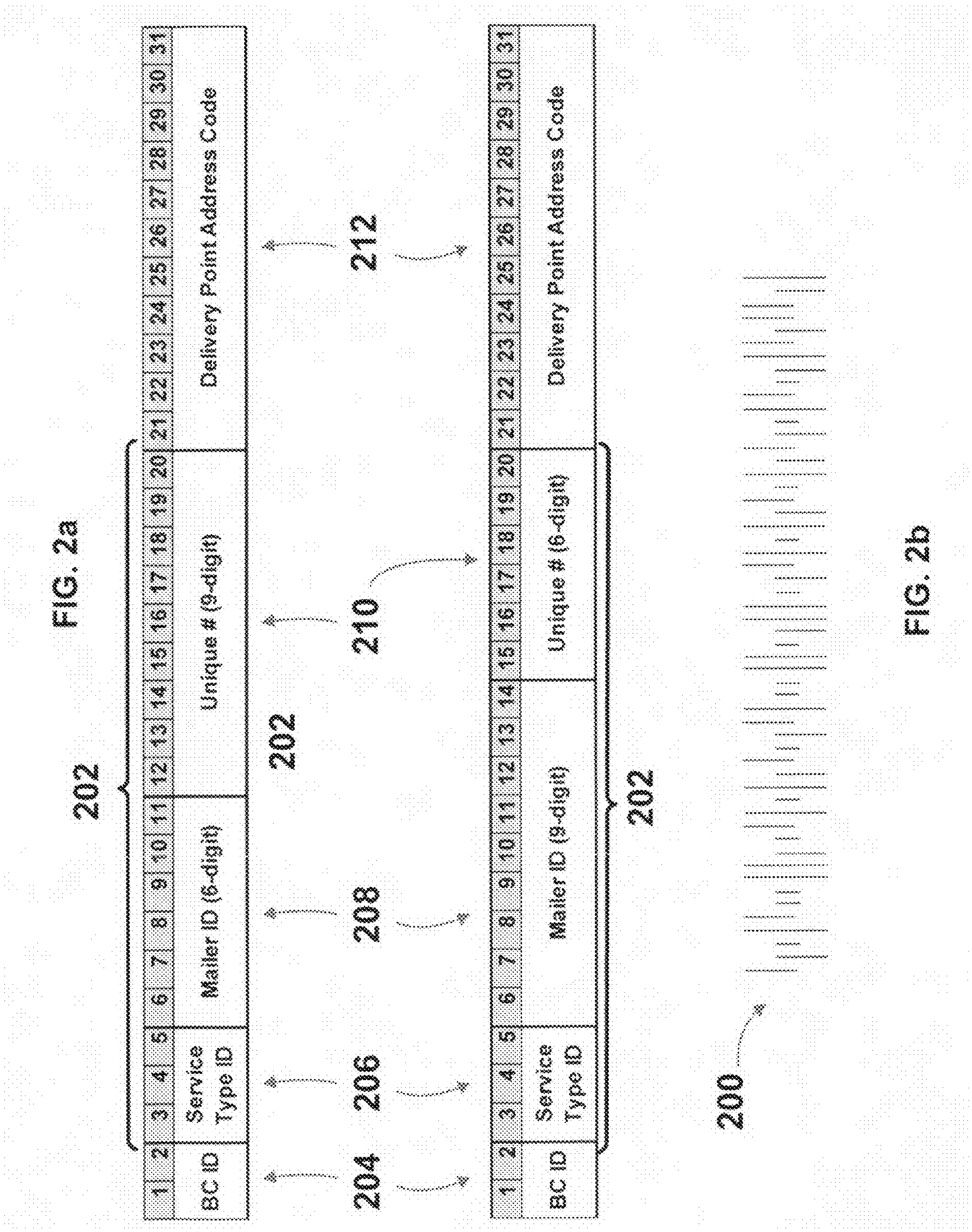
FIGS. 2*a*-2*b* depicts an exemplary barcode data structure and barcode identifier capable of being applied to a mail item.

To facilitate the tracking of mail items displaying various delivery point identifiers as they are processed within a multiple document processing system environment, a convenient tracking means is required. More specifically, the tracking means must be unique within the environment, and remain so for a given period of time, despite voluminous mail items that may be handled by the environment. FIGS. 2*a*-2*b* depict an exemplary postal authority approved code in the form of a barcode that allows for such tracking of mail items destined for placement with a particular postal authority mail group. In particular, the exemplary barcode structure and type presented herein pertain to the Intelligent Mail Barcode (IMB) 200. Nonetheless, those skilled in the art will recognize that the IMB 200 is an exemplary postal authority approved code and does not limit the scope and application of the techniques and concepts presented herein. Furthermore, though presented herein with respect to a postal authority (e.g., USPS), the exemplary techniques described may be applicable to any mail item delivery service or carrier that may benefit from schemes to enable appropriate mail identification uniqueness. Indeed, any type of postal code, be it barcode based, alphanumeric, graphical or other may be employed within the context of the examples herein. It will be seen with respect to FIGS. 3-4 that a postal authority approved code, such as the IMB, may be generated in such a way to ensure uniqueness of a mail item for a specified period.

The IMB 200 is a height modulated barcode that uses varying vertical bar types to encode data as shown in FIG. 2A. When used to qualify for automation discounts, the IMB can be placed in the address block or in the barcode clear zone, generally found on the lower right corner of a mail item, as depicted in the mail items of FIG. 1. The IMB 200 is a 31-digit postal authority code, with fields for encapsulating various data as shown in FIG. 2A. As recognized by those skilled in the art, various barcode generation software tools, fonts and/or encoders may be used to generate the IMB in accord with postal authority requirements. Data fields comprising the IMB 200 include, but are not necessarily limited to: a two-digit barcode identifier 204, a three-digit service type identifier 206, a six or nine-digit mailer identifier 208 (MID), a nine or six-digit unique number 210, and a delivery point address code 212 that can be zero, five, nine or eleven-digits. The MID 208 when taken in combination with the unique number 210 and service type identifier 206 comprise a 18-digit Unique Identifier 202.

The mailer ID (MID) 208 is generally defined and/or assigned by the postal authority based on the mailer's annual mail volume or other criteria. Generally, all 6-digit MIDs will begin with '0' through '8', while all 9-digit MIDs begin with '9'. The service type identifier 206 specifies a particular postal authority approved mail class and service(s) to be executed upon the mail item, such as First Class, Standard Mail, Periodicals, etc in the case of the United States Postal Service (USPS). The delivery point address code 212 contains ZIP Code data of varying ranges (e.g., 5-digit ZIP versus 11-digit ZIP). The unique number 210 may be assigned at the discretion of the mailer, but must be certifiably unique for a period of time specified by the postal authority (e.g., 45 days for USPS). Various techniques for determining the uniqueness may be employed by the mailer for encoding as the unique number 210, including but not limited to: serializing the mail items, embedding Julian date parameters, embedding mailing event data, using recipient identifier data, using database or mailing record ID. Those skilled in the art will recognize however that such 'static' encoding techniques are limited in their usefulness considering the dynamic nature of mail processing, particularly within a single multiple document processing device environment; where a particular clients' mailing may be distributed across differing devices.

Figure 3:
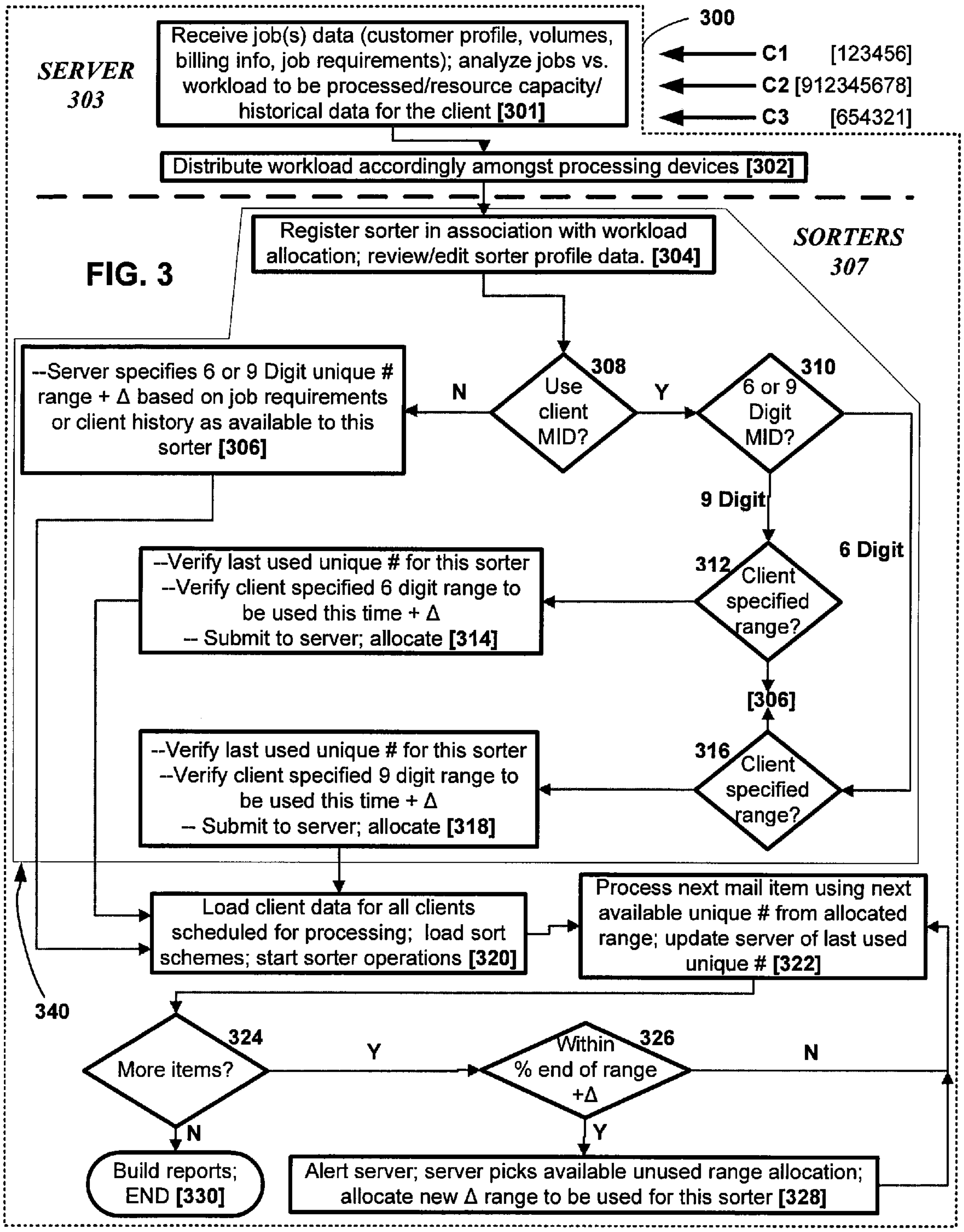
FIG. 3 is flowchart depicting the process by which the barcode data structure of FIG. 2*a* may be populated to guarantee its uniqueness within the mail processing environment of FIG. 1.
Figure 4:
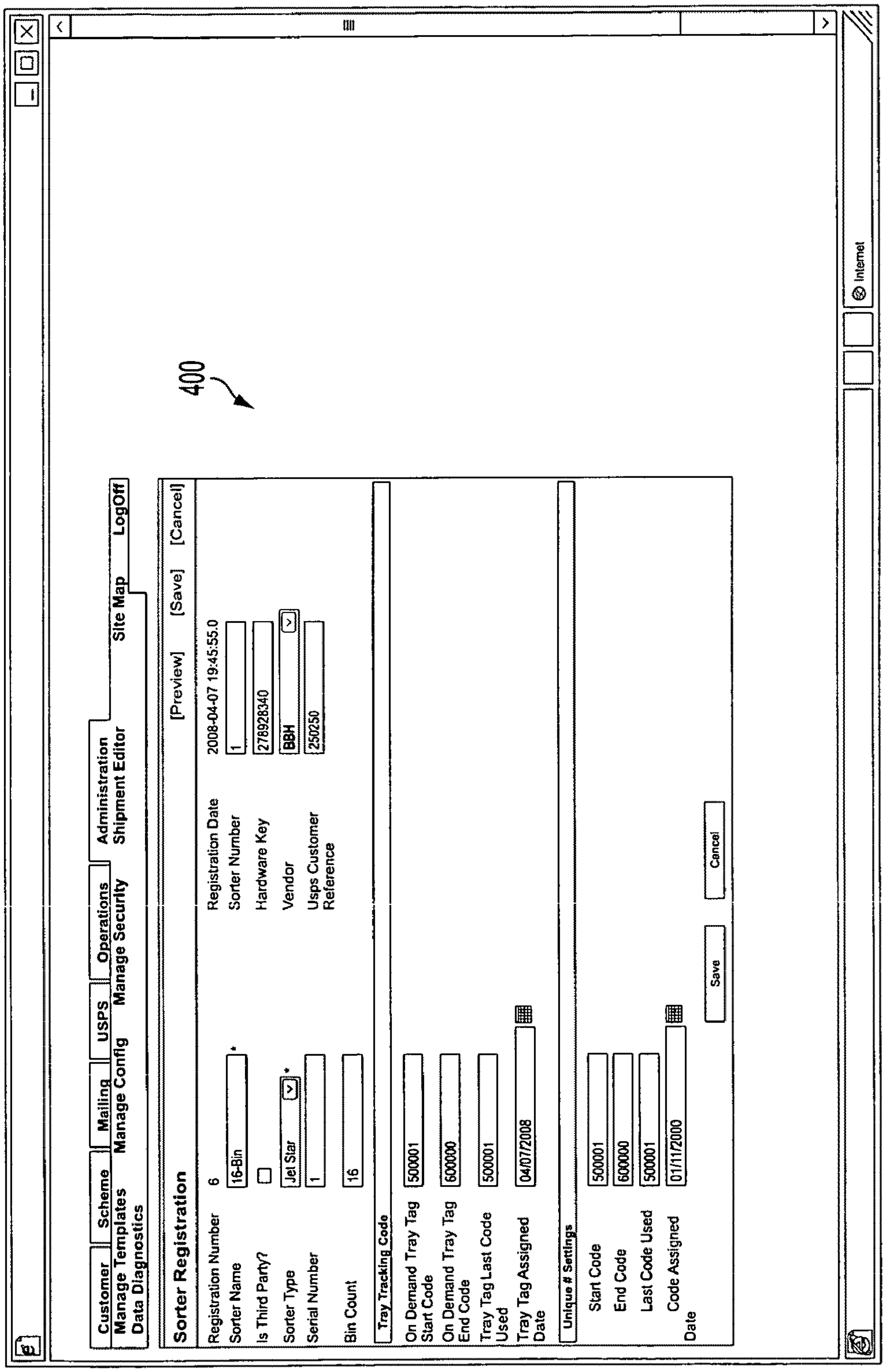
FIGS. 4-5 depict exemplary graphical user interfaces for enabling setup and/or registration of devices and customers within the mail processing environment to facilitate processing.
Figure 5:
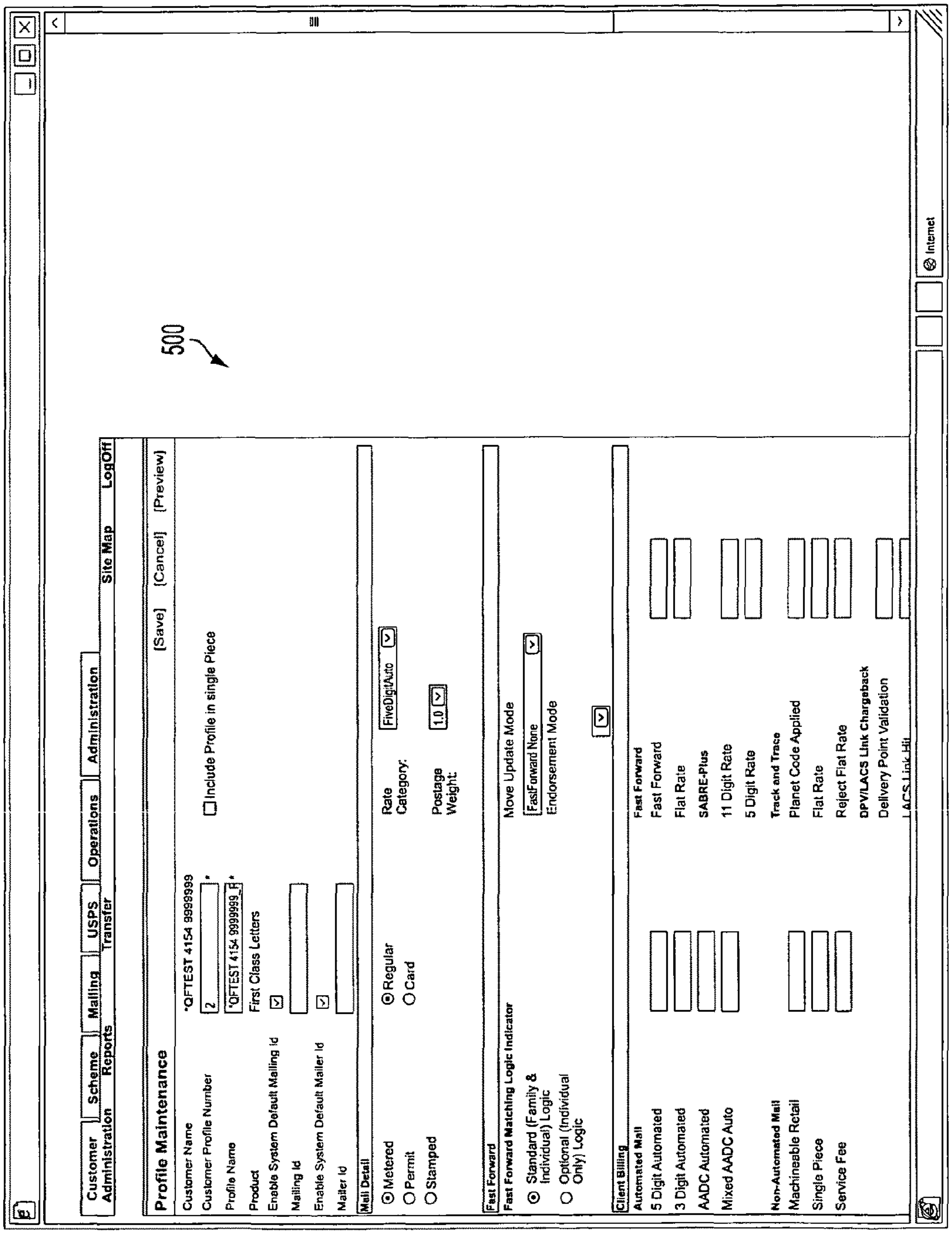

While various other details regarding the IMB may be emphasized, the discussion will proceed to FIG. 3, which presents an exemplary flowchart depicting the process by which the unique numbers may be allocated and assigned within a multiple document processing system environment to ensure uniqueness of mail items for a specified period of time. More specifically, the assigned unique number may be encoded within a postal authority code, such as the IMB, on the basis of a 6 or 9-digit mailer identifier 208. Again, those skilled in the art will recognize that the IMB is only one of several types of present day and future postal authority code implementations suited for this purpose.

Multiple customers C1-C3 (mailers) to be serviced by a sort processing provider 300, having varying assigned MIDs 123456, 912345678 and 654321 respectively, may send their mail jobs to be processed accordingly. Each customer—each representing an independent mailer having independent mail processing needs—may send various information to the sort processing provider 300 in advance to facilitate the job, including but not limited to, profile data such as the assigned MID particular to that mailer, the approximate volume of mail items to be processed, billing information, job requirement specifications, etc. In addition to the information, each mailer C1-C3 sends its physical mail items, which, from the perspective of the sort processing provider 300 may be sorted and aggregated entirely or in part into a mailing for submission to a postal authority or other distribution channel. Alternatively, the one or more customers C1-C3 may provide intelligence regarding the mail items to be processed in advance, such as respective ZIP Code designations, weight classifications, postal authority approved code data, etc.

Once the above described job information is received by a server 303 of the sort processing provider 300, it may be analyzed against the overall workload requirements of the sort processing provider 300, resources available, and/or historical job information pertaining to the one or more customers C1-C3 (event 301). Upon analysis, the workload may be distributed amongst the plurality of sorters accordingly (event 302). Appropriate workload distribution factors may include, but is not limited to, the processing capabilities of the sorters relative to customer requirements, the required time for mail item distribution relative to the current jobs allocated, operator availability, bin capacity of the sorters relative to the number of mail items to be processed, etc. It should be noted also that various means for initializing a range of unique numbers for usage by the various sorters within the sort processing environment 303 respective to a designated MID, may include but is not limited to the following:

- Server 303 enables an entire initial starting range, such as 001,000,000 to 999,999,999 for use when a 6-digit MID is specified; 000,001 to 999,999 for use when a 9-digit MID is specified;
- Server 303, with respect to this initial starting range for both 6-digit and 9-digit MID respectively, further apportions this initial range amongst the various sorters 307 of the sort processing provider 303. The appropriation may be in accord with resource needs, resource proportion or other, such that each respective sorter may allocate unique numbers from its own assigned range. Furthermore, the appropriation takes into account the particular mail items that are to be processed to complete the jobs based on known job data (e.g., ZIP Code data, Unique identifier values, mail counts, etc.) with respect to workload capabilities.

Alternatively, ranges may be initialized on a 6 or 9-digit basis by customer profile. Of course, those skilled in the art will recognize that any means of range initialization may suffice with respect to the teachings herein. In particular, such initialization may be performed prior to the receipt of jobs from customers C1-C3.

In order to process the received jobs, each sorter 307 must be individually registered with respect to the mailing or its portion thereof as distributed by the server 303. Registration may be performed via a graphical user interface (GUI), shown in FIG. 4, as accessed by an operator of a given sorter from an associated sorter computer. The various fields of the registration GUI 400 may be populated by the server automatically according to records maintained. Various fields of the registration GUI 400 may include, but are not limited to, the starting unique number within the range allocated, the ending unique value number within the range allocated, the last value used within this allocation and the date of use of this last unique number. Sorter registration need only be performed once with respect to the mailing.

As each customer C1-C3 provides profile information and job requirement information, this may include the MID information for the customer along with instructions for MID use within a postal authority approved code. Customer profile information may be coordinated to process physical mail items upon a given sorter via profile maintenance GUI 500. As with the sorter registration GUI 400 described above, the various fields of the GUI 500 may be populated by the server according to records maintained. Various fields of the profile maintenance GUI 500 may include, but are not limited to, the customer name, assigned MID, etc. When a profile is selected, the sorter will send a request to the server. The server can then allocate a range of unique numbers to be used by the requesting sorter in various ways depending on the type of MID value to be employed. When the sort processing provider's 6 or 9-digit MID is being used to process mail items, the server may return the appropriate complimentary 9 or 6-digit unique number range to be used based on an average/historical mail count for this customer or actual count specified by the customer profile (events 308 and 306). The returned range will comprise values not previously used in association with said customer/mailer within the postal authority specified time period, hence ensuring they are unique. In the case of an actual count from the customer profile, then the operator must modify the customer profile each time before use. If a customer has a history of having more mail on a certain date or weekday, a separate profile can be used for this customer; a different customer profile on a certain date for processing. Optionally, the server may assign a buffer range Δ to be used for instances of unexpected out of range mail, so as to prevent stopping of the sorter.

When the customer's own postal authority assigned 6 or 9-digit MID is being used to process mail items as opposed to the sort processing provider's, the server may again return the appropriate complimentary 9 or 6-digit unique number range to be used based on an average/historical mail count for this customer or actual count specified by the customer profile (events 308, 310 and 306). The returned range will comprise values not previously used in association with said customer/mailer within the postal authority specified time period, hence ensuring uniqueness. Alternatively, in instances where the customer provided its own unique number ranges for usage by the sort processing provider (events 312 and 316)—wherein the ranges are guaranteed unique by the customer (mailer)—this information is validated by the server (events 314 and 318) to ensure no inadvertent reuse or range overrun. Those skilled in the art will recognize that the sorter registration and profile maintenance process may be considered independent tasks of an overall setup and/or registration process 340 necessary for enabling processing of mail items respective to the mailing. Differing sort processing providers will employ varying means of facilitating this process in accord with their software, server, sorter and resource capacity and requirements.

After the allocation is performed, each sorter processes the mail items accordingly. A sorter will continue to process mail items for as long as there are more to process (event 324) using the next available unique number within the allocated range. All the while, the server 303 will be updated accordingly of the last used unique number (event 322) as well as the date of use. If the last used unique number is within a percentage threshold of the final number within the allocated range, the optional buffer range may be employed to prevent sorter stoppage (events 326 and 328). When all items are processed—i.e., sorted to respective bins with applied postal codes encoded with the unique MID, unique number and service type identifier in combination to formulate a unique identifier value 202, reports may be generated and the sort process may end (event 330).

Those skilled in the art will recognize that synchronized and real-time communication between the server 303 and the sorter computer of a given sorter may be facilitated to enable various aspects of the above described functionality. So, for instance, as depicted in FIG. 3 the sorter will update the last used unique number to the server database for each piece run so far dynamically and continuously in near real-time. The server may then update the GUI accordingly with respect to changes in range usage, such as displaying the (MIN, MAX) range value and updated last used sequence number. Upon completion of the job, the server may be updated, and the last used number may be recorded as the MIN value. The MAX and MIN values need to be sufficient for uniqueness for a specified period (e.g., 45 days) mandated by a postal authority or the sort processing provider. Date-of-use information maintained by the server for specific range allocations may be released at the end of a specified time period so as to make the range available for present or future use.

While the various examples pertain primarily to a sorter or multi-sorter environment primarily, those skilled in the art will recognize that any document processing environment may take advantage of the aforementioned techniques, including mail preparation or inserter-based environments. Furthermore, it will be recognized by skilled artisans that the techniques and concepts described herein relate to functions of document processing environments, including pre-sort bureaus, shared mailing networks, captive shops, inbound or outbound sorting environments and the like.

Although the discussion above has focused largely on the methodologies of sorter or multi-sorters, those skilled in the art will recognize that those methodologies may be controlled or implemented by one or more processors/controllers, such as one or more computers (ref. numeral 110, 112 in FIG. 1) or servers (ref. numeral 114 in FIG. 1). Typically, each such processor/controller is implemented by one or more programmable data processing devices. The hardware elements operating systems and programming languages of such devices are conventional in nature, and it is presumed that those skilled in the art are adequately familiar therewith.

Figure 7:
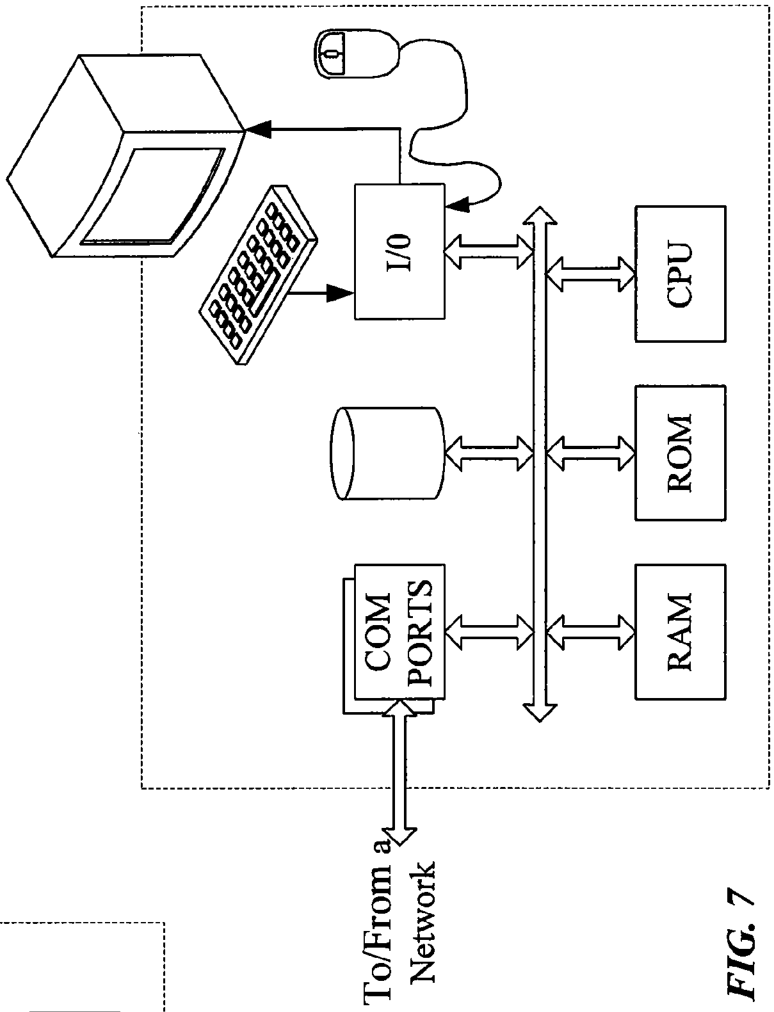
FIG. 7 depicts a computer with user interface elements.
Figure 6:
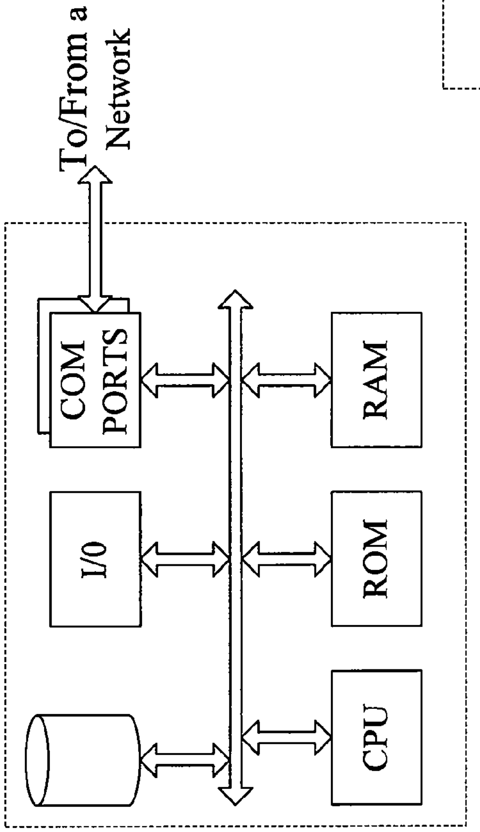
FIG. 6 illustrates a network or host computer platform, as may typically be used to implement a server.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and, as a result, the drawings should be self-explanatory.

For example, sorter server 114 may be a PC based implementation of a central control processing system like that of FIG. 7, or may be implemented on a platform configured as a central or host computer or server like that of FIG. 6. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for configuring a plurality of mail item sorters, the method comprising steps of:

receiving job information pertaining to a plurality of mail items received from a mailer to be processed amongst the plurality of sorters;

registering each of the respective sorters, the registration step including:

accessing the job information for a respective sorter from an interface to a server;

accessing, by way of a computer, a range of values to be used in connection with a postal authority approved code to be applied on each of the plurality of mail items, said range being accessed from the interface to the server, each range of values conforming to a specific mailer identification, the specific mailer identification is selected from a 6 digit or 9 digit value assigned by a postal authority and incorporated into the postal authority approved code;

allocating, by way of the computer, a portion of each of the ranges of values to be used by the sorters based at least in part on said received job information, wherein a predetermined percentage of values in the range of allocated values is established, such that the server is alerted when the predetermined percentage of values in the range of allocated values is assigned during sorting;

verifying, by way of the computer, that no values in the allocated portion have been used within an associated date of usage by each respective sorter prior to processing, the associated date of usage being a period of time approved by the postal authority; and loading the plurality of sorters with a respective sort scheme.

2. The method of claim 1, further comprising the step of: starting sorter operations.

3. The method of claim 2, further comprising the step of: for each mail item processed on a first sorter, assigning a next available value from the allocated range of values associated with mail item.

4. The method of claim 3, further comprising the step of: updating the server of a last used value from within the allocated range.

5. The method according to claim 1, wherein the receiving step includes:

the server receiving the job information selected from mailer profile data, mail item volume, job requirements or mailer billing particulars.

6. The method of claim 1, wherein the distributing step includes:

distributing the mail items between the sorters based on the received job information and resource capability of the one or more sorters.

7. A method for configuring a plurality of mail item sorters, the method comprising steps of:

receiving job information pertaining to a plurality of mail items received from a mailer to be processed amongst the plurality of sorters;

registering each of the respective sorters, the registration step including:

accessing the job information for a respective sorter from an interface to a server;

accessing, by way of a computer, a range of values to be used in connection with a postal authority approved code to be applied on each of the plurality of mail items, said range being accessed from the interface to the server, each range of values conforming to a specific mailer identification;

allocating, by way of the computer, a portion of each of the ranges of values to be used by the sorters based at least in part on said received job information; and verifying, by way of the computer, that no values in the allocated portion have been used within an associated date of usage by each respective sorter prior to processing;

updating, by way of the computer, the server of a last used value from within the allocated range;

for each mail item processed on a first sorter, assigning a next available value from the allocated range of values associated with mail item;

loading the sorters with a respective sort scheme;

starting sorter operations; and alerting the server when a predetermined percentage of values in the range of allocated values is assigned.

8. The method of claim 7, further comprising the step of: applying a postal authority approved code of on each of the plurality of mail items.

9. The method of claim 8, wherein the postal authority approved code includes the respectively assigned value for a particular mail item together with the specific mailer identification.

10. The method of claim 7, further comprising the step of: generating a report upon completion of sorting of the plurality of mail items.

* * * * *